US008184613B2

(12) United States Patent
Patel et al.

(10) Patent No.: US 8,184,613 B2
(45) Date of Patent: May 22, 2012

(54) PORTABLE MULTI-MEDIA AUTOMATIC AUTHENTICATING ROUTER AND METHOD FOR AUTOMATICALLY ROUTING STORED DATA

(76) Inventors: Nilesh V. Patel, Novi, MI (US); Mark H. Schwartz, Livonia, MI (US)

( * ) Notice: Subject to any disclaimer, the term of this patent is extended or adjusted under 35 U.S.C. 154(b) by 544 days.

(21) Appl. No.: 11/504,881

(22) Filed: Aug. 16, 2006

(65) Prior Publication Data
US 2007/0237128 A1    Oct. 11, 2007

Related U.S. Application Data

(60) Provisional application No. 60/790,762, filed on Apr. 10, 2006.

(51) Int. Cl.
*H04L 12/28* (2006.01)
(52) U.S. Cl. .................................. 370/351; 370/395.72
(58) Field of Classification Search ........................ None
See application file for complete search history.

(56) References Cited

U.S. PATENT DOCUMENTS

| | | | |
|---|---|---|---|
| 2002/0038450 A1* | 3/2002 | Kloppmann et al. | 717/102 |
| 2003/0024991 A1* | 2/2003 | Tuli | 235/472.01 |
| 2005/0278618 A1* | 12/2005 | Ogikubo | 715/513 |
| 2007/0061394 A1* | 3/2007 | Frid-Nielsen et al. | 709/202 |
| 2007/0073751 A1* | 3/2007 | Morris et al. | 707/101 |
| 2007/0075131 A1* | 4/2007 | Alberth et al. | 235/380 |
| 2007/0147617 A1* | 6/2007 | Hull | 380/270 |
| 2008/0188181 A1* | 8/2008 | Choi et al. | 455/41.2 |
| 2008/0280646 A1* | 11/2008 | Poo et al. | 455/556.2 |

* cited by examiner

*Primary Examiner* — Nittaya Juntima
*Assistant Examiner* — Tito Pham
(74) *Attorney, Agent, or Firm* — Harness, Dickey & Pierce, P.L.C.

(57) ABSTRACT

A computer program product and automatic authenticating router device for automatically routing stored data from a single device to at least one remote storage location is provided. The router device includes the computer program product. The computer program product includes a computer readable medium bearing software instructions for enabling predetermined operations. The predetermined operations include detecting an availability of a proximal network; automatically establishing a connection with the at least one remote storage device based on the availability of the proximal network; automatically recognizing a data type of a data file stored on the single device; associating routing information with the data file based on the data type; and automatically uploading the data file from the single device to the remote storage device based on the routing information.

1 Claim, 14 Drawing Sheets

```
<?xml version="1.0"?>
<!-- This is an action based configuration where the final
task could be combination of hierarchical subtasks. The action
can take its own predefined parameters and scripts to complete
the transaction. The action parameters - id, name and descriptions
is optional. The actions are always bottom up executed. If multiple
actions are not present at the leaf node, that action may not be presented
to the user and jumped right into leaf node action -->
<config>
    <do what="authenticate" id="XXX" name="GOTR" description="">
        <authenticate login="xxx" password="***" use_hw_id="false">
            <![CDATA[ ..... Some scripts .... ]]>
        </authenticate>
    </do>

<!-- Showing configuration for hierarchical action processing -->
    <do what="assign" id="1" name="" description="">
        <assign account_id="XX" account_name="Name"
                account_description="Description">
            <![CDATA[ ..... Some Script .... ]]>
            <do what="assign" id="11" name="Account Sub-ID" description="">
                <assign account_id="XX" account_name="Name"
                        account_description="Description">
                    <![CDATA[ ..... Some Script .... ]]>
                    <do what="assign" id="111" name="Simple Type" description="">
                        <assign account_id="XX" account_name="Name"
                                account_description="Description" authenticate_id="XXX">
                            <![CDATA[ ..... Some script ... ]]>
                        </assign>
                    </do>
                </assign>
            </do>
        </assign>
    </do>
</config>
```

Figure 3

Micro-scanner configuration

PDA Attached Solution

PORTABLE MULTI-MEDIA AUTOMATIC AUTHENTICATING ROUTER AND METHOD FOR AUTOMATICALLY ROUTING STORED DATA

CROSS-REFERENCE TO RELATED APPLICATIONS

This application claims the benefit of U.S. Provisional Application No. 60/790,762, filed on Apr. 10, 2006. The disclosure of the above application is incorporated herein by reference.

FIELD

This disclosure relates to devices and methods for facilitating management of both paper based documents and electronic files by providing means to capture, classify, recognize, temporarily store digital data and images, and then automate electronic transmission of this information to remote facilities for backup, storage and/or processing.

BACKGROUND

Need for Remote Storage and Processing of Multiple Digital Data Types

Individuals currently utilize multiple personal electronic devices. These frequently include cell phones, personal digital assistants, digital music players, digital cameras, and portable computers. Each of these units stores its information internally in a suitable but distinct digital format. Because of the limited internal memory capacity within each of these devices, it has become common for them to either provide the user the ability to copy their internal memory or a removable memory chip or stick by which said user can shuttle the information and thereby backup the stored data. It is highly desirable to duplicate the information stored on each of these devices not only because of their limited memory capacity but also because of the safety that a second copy affords against accidental loss. It is also necessary to enact these transfers in order to facilitate any additional processing of the digital information that needs to be performed.

In recognition of this requirement for remote storage, a number of new solutions have been developed to facilitate said transfer processes. These approaches include, in addition to new digital storage formats and media, novel devices that facilitate the usage of said media types to allow their data to be transferred to a hard disk within a personal computer. However, these backups to a personal computer all require special purpose software, complex user interactions, typically a personal computer, and either an actual physical or wireless connection to be made between the transfer devices and the user's designated computer.

Technical Difficulties with Processing of Business Documents

Computerization has improved the productivity of most areas of business. However the promise of the paperless office has yet to become ubiquitous. A specific example of a business area in which the present methods for storage of data are especially cumbersome is the case of documents for financial transactions. In reality, it remains a manual and tedious process to perform all the document handling necessary to compile numerous paper based receipts in order to itemize expenditures for either an individual or a business enterprise.

The reliability of scanning and imaging hardware and software currently makes it possible to store digital copies of paper documents. Advances in optical character recognition (OCR) software make it further possible to perform fairly reliable conversion of machine generated text into a digital format especially when reading a form of fixed and known type. Yet, despite these technological advances in document scanning, digital image storage and retrieval, several critical drawbacks remain with the efficiency of processing, for example, expenditures for accounting type purposes.

Key areas of weakness include the lack of portability of the hardware systems for scanning the documents and the number of steps necessary for transfer of the scanned documents to the post processing systems. The present invention introduces a device which makes possible the streamlining of these steps to the extent of absolutely minimizing work to be done by the end user.

Digital Device Backup Procedures

The increased reliance on digital technologies for music, video, and photographic purposes has resulted in a proliferation of digital storage solutions. In particular, flash technology was invented in order to provide replaceable memory for portable devices. This storage solution is non-volatile in that it does not require a constant power source to indefinitely retain data. These kinds of products are solid state, meaning they contain no moving parts, and therefore provide much greater protection of their data than conventional magnetic disk drives. A number of formats for flash memory cards have been created which include among others: CompactFlash, Secure Digital, SmartMedia, and Sony Memory Sticks. The storage capacity of these digital devices has grown exponentially, with advances in technology for storage density on hard disks and also in volatile memory. While the increased memory capacity makes backup processes less frequent, the need for filing disposition which requires human intervention is a problem which is burgeoning with increases in digital data. Also, in order to perform the actual transfer process the user is typically required to operate software on both the sending device and receiving computer which then initiates execution of the file transmission. This type of upload process is classic pull technology whereby action is required on the part of the recipient and cannot be sent as soon as it is available.

Digital File Transfer Devices

With the proliferation of digital memory cards and devices with built in memory, a number of new devices have been invented to assist in transferring digital files to personal computers. For example, Memorex has a device called the TravelSync which can transfer files between two USB mass storage devices without using a computer. This device allows the sharing of music, photos, or data between flash cards, USB flash drives, digital cameras, external hard drives, or MP3 players. SanDisk produces a product called the ImageMate which can also perform similar file transfer functions with as many as twelve different formats of flash memory.

External memory and hard drives now frequently offer so-called "One-Click" or "One-Touch" backup procedures which use a single step to initiate automatic computer backup procedures to an external hard drive. The software programs initiated by a button press on these hard disks do simplify the backup process. However, these units cannot automatically perform the classifications to assist in transfer of data files to their appropriate locations.

Document Transcription

Major improvements in transcription services are attributable to advances in digital recording, and personal computing. Originally transcription services consisted of a secretary taking dictation in shorthand. Later, the secretary would type from their handwritten notes. With improvements in recording machines, managers became able to make recordings by themselves without their assistants present. The recording could then be transferred to the playback machine for transcription by the secretary. Presently, recording devices can record an audio file directly into digital format which can be wired over the internet to any remote location for additional processing. However, transferring the audio files to various locations for transcription or translation requires human intervention and slows down the overall process.

Personal Scanners

A large number of products are now available to portably scan documents including specialized devices such as those dedicated to reading of business cards. These card readers use OCR to attempt to automatically extract the name, address, phone number, and fax number fields and export them to a computer software program that then manages the contacts. These scanning products are designed to ignore artwork and only import text information.

However, all of the above mentioned systems are deficient in their ability to serve as platforms to expedite data file processing, routing and storage. This is because they require human intervention in order to tag their acquired data files with a unique identifier. Extra operator steps are also necessary for enacting an upload of the scanned documents and to properly route the scanned documents to their appropriate locations.

SUMMARY

In order to alleviate frustration of users and vulnerability of personal computing platforms during management of information transmission and receipts, a portable multi-media automatic authenticating router (PMAAR) is provided. This PMAAR device is a smart and self-contained information router, which removes the need for a desk top, or even laptop computer to handle information passing between a user's personal digital devices and remote storage facilities.

Accordingly, a computer program product and PMAAR device for automatically routing stored data from a single device to at least one remote storage location is provided. The router device includes the computer program product. The computer program product includes a computer readable medium bearing software instructions for enabling predetermined operations. The predetermined operations include detecting an availability of a proximal network; automatically establishing a connection with the at least one remote storage device based on the availability of the proximal network; automatically recognizing a data type of a data file stored on the single device; associating routing information with the data file based on the data type; and automatically uploading the data file from the single device to the remote storage device based on the routing information.

In other features, a multi-media automatic authenticating router device is provided. The device includes a processor. A first storage medium stores multi-media data in a database format. A second storage medium includes software instructions that are performed by the processor. The software instructions enable predetermined operations. The predetermined operations include detecting an availability of a proximal network; automatically establishing a connection with at least one remote storage device based on the availability of the proximal network; automatically recognizing a data type of a data file stored on the router device; associating routing information with the data file based on the data type; and automatically uploading the data file from the router device to the remote storage device based on the routing information.

In still other features, a method of automatically routing stored data from a portable device to at least one remote storage device is provided. The method includes configuring routing information related to personal storage accounts; storing multi-media data files; automatically recognizing a data type of each of the multi-media data files; associating routing information with each of the multi-media data files based on the data type; detecting an availability of a proximal network; automatically establishing a connection with at least one remote storage device based on the availability of the proximal network; and automatically uploading multi-media data files from the single device to one or more remote storage devices based on the routing information.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 shows an exemplary device configuration file which assists in generating a routing information file.

DETAILED DESCRIPTION

Figure 1:
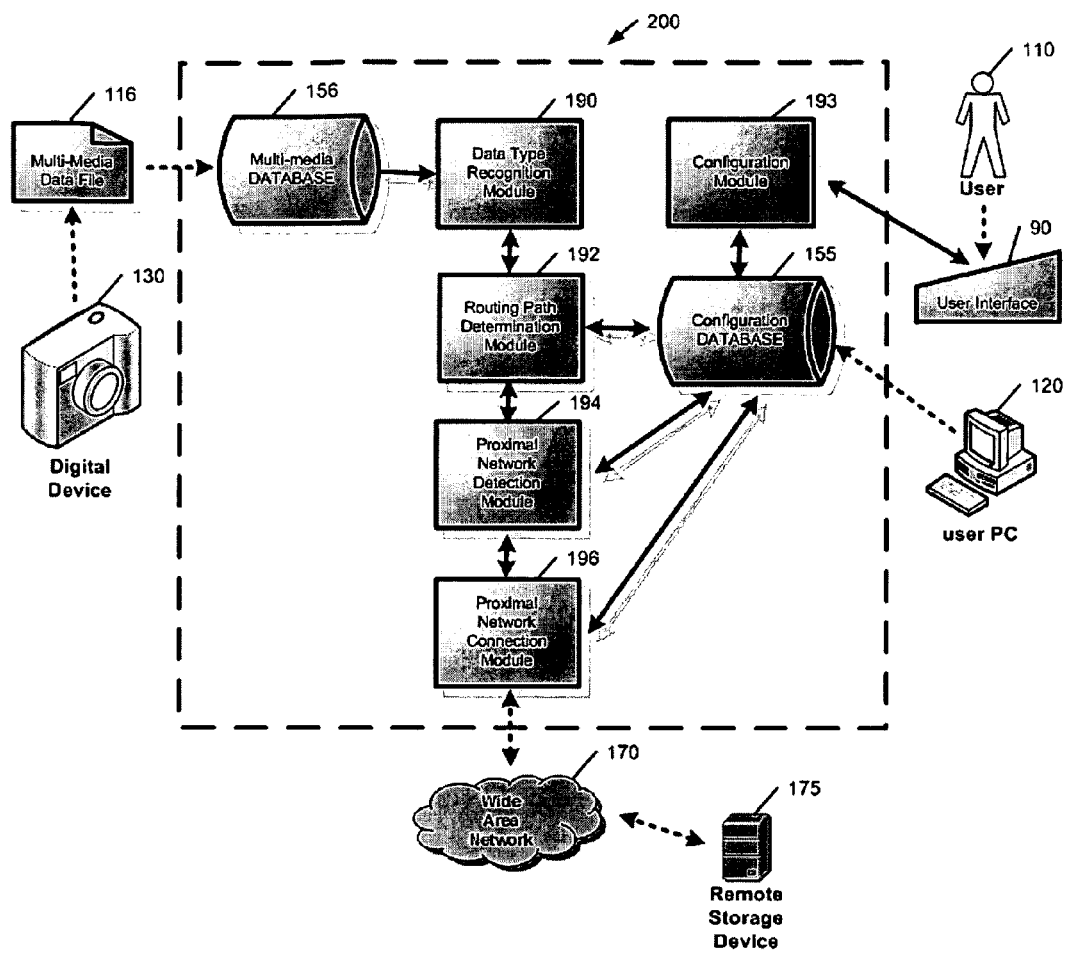
FIG. 1 shows a high level overview of software modules of a computer program that performs automatic authenticating routing.

The following description is merely exemplary in nature and is not intended to limit the present disclosure, application, or uses. It should be understood that throughout the drawings, corresponding reference numerals indicate like or corresponding parts and features.

The following discussion assumes the reader is familiar with embedded processor hardware, scanning hardware, OCR software, accounting procedures, normal business practices for employee expense reimbursement, and procedures for tax calculation and record keeping.

The present disclosure describes various embodiments of automatic authenticating router devices that comprise elements for (1) initial setup—as provided by a special routing information file containing website addresses, login identification, passwords, and disposition preferences; (2) internal security—as provided by an embedded device identification to verify that contents to be uploaded are being transmitted from a trusted source, and as provided by encryption of stored password information; (3) multi-media data capture—as provided by multiple connective ports to permit connection to various digital devices and portable memory sources; and (4) upload device data—provides means for unattended routing of internally stored data based upon preferences created during setup. Various embodiments of an automatic authenticating router device include various implementations and combinations of the above described elements as will be described in more detail below.

Figure 4:
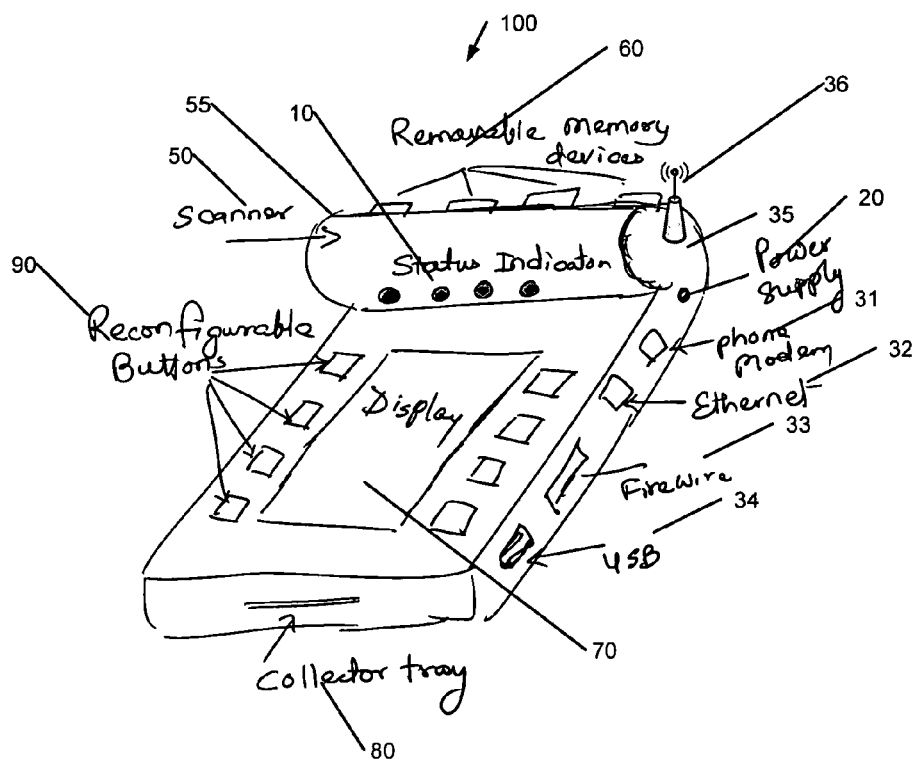
FIG. 4 shows exterior hardware of an embodiment of an automatic authenticating router device including inputs, outputs and user interface.

FIG. 1 shows a high level overview of software modules of a computer program 200 that performs automatic authenticating routing of multi-media data files while minimizing efforts from the user. The computer program 200 can be downloaded to or embedded in an automatic authenticating router device 100 as shown in FIG. 4. Various software data structures and sub-modules necessary for performing automatic authenticating routing are encapsulated within the computer program 200. It is appreciated that the modules shown may be combined and/or further partitioned to similarly perform automatic authenticating routing.

More particularly, various digital hardware units such as an exemplary digital photo device 130 provide a source for multi-media data files 116. The multi-media data files are captured and stored in a multi-media database 156. A data type recognition module 190 processes the individual data files 116 which have been acquired for routing by the computer program 100. The data type recognition module 190 determines classifying features such as a data type of each digital file 116 for input to a routing path determination module 192. In various embodiments, the data type is automatically recognized based on data associated with the digital file. For example, the data type can be extracted from meta-data associated with the file. The routing path determination module 192 uses the data type information to configure a routing path based upon the disposition requirements stored in a configuration database 155.

The configuration database 155 contains records containing various action parameters and scripts. For example, an authentication record may contain information such as a remote uniform resource locater (URL), user identifications, passwords, and software instructions in the form of a script which makes possible execution of login operations. Similarly, an upload record may contain the disposition information used to automatically upload the captured multi-media data. A configuration module 193 configures device operation information and then records and stores them in the configuration database 155. In various embodiments, the configuration module 193 configures the records based on information received from a user 110 via a user interface. Alternatively, the records can be preconfigured on a user pc 120 and uploaded to the configuration database 155 via configuration software.

Also as shown in FIG. 1, a proximal network detection module 194 detects a network within a proximity of the device. For example, the proximal network detection module 194 polls onboard hardware devices which seek wireless, wired and modem connections for activity. If a network is detected to be within a proximity of the device, either directly connected to or within range of a network, a proximal network connection module 196 establishes a network connection. During configuration of the device by the configuration module 193, preferences can be set as to which connection should take precedence when multiple connection options are available. However, given detection of at least one proximal network, the proximal network connection module 196 secures a connection and performs not only the necessary login steps but also uploads the data file 116 to an appropriate remote storage device 175 via a wide area network 170. The configuration module configures predetermined protocols for each upload location based on information received from the user 110.

Figure 2:
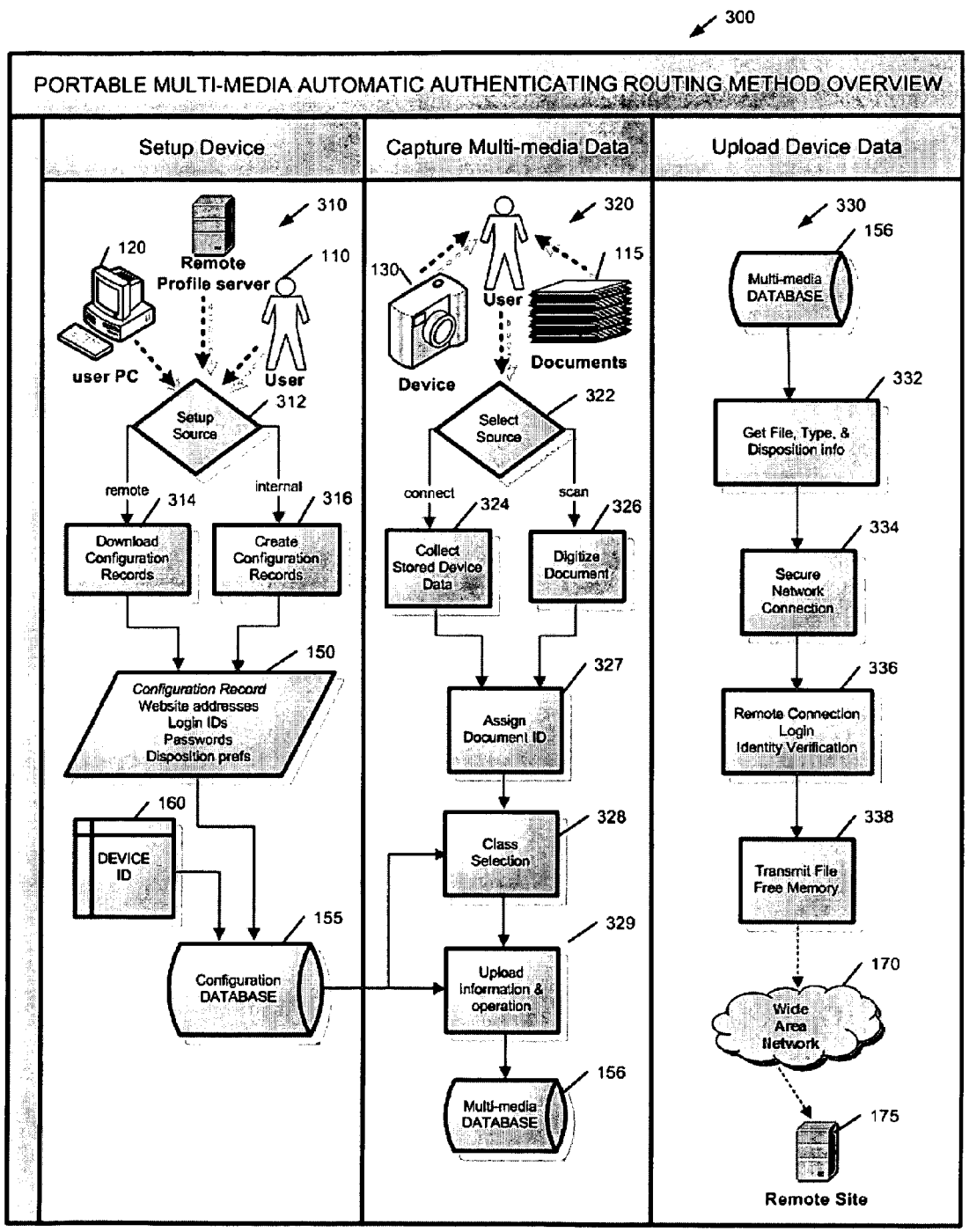
FIG. 2 illustrates a functional overview of a multi-media automatic authenticating routing methodology.

FIG. 2 illustrates a functional overview of a multi-media automatic authenticating routing methodology 300 as performed by various embodiments of the computer program 200. More particularly, FIG. 2 illustrates various processes for performing device setup, capture of multi-media data, and upload of device data. As shown in FIG. 2, a user 110 can either employ a personal computer 120 to initiate a setup device process 310 or provide manual information via a user interface to initiate the setup process 310. To initiate the process of capture of multi-media data, a user 110 either attaches a digital device 130 to a port on the device 100 or scans documents 115 directly into the routing device. The upload device data process is automatically initiated when the device setup process and the capture of multi-media data process are complete.

The setup device process is shown generally at 310. The user 110 selects the source of the setup information at 312. By usage of an external personal computer 120 the user 110 is stepped through questions in a program which assists in assembly of the device setup information. Alternatively, the user 110 directly answers questions displayed by the user interface to provide setup information which is sufficient to complete the configuration record 150. The configuration record 150 includes among other fields website addresses, login identifications, password information and disposition information for each file type and classification. The configuration records are combined and may use an embedded device identification number 160, if specified in a record parameter, for authentication or any other operation or action. The collection of such records makes up the configuration database 155.

The capture multi-media data function is shown generally at 320. Data from a digital multi-media device 130 or printed documents 115 are input based on the source at 322. The source 322 from which data will be captured can be selected by synchronizing with a connected digital device 130 as shown at 324. Alternatively, the documents 326 can be scanned as shown at 326. Both of these cases result in creation of a digital data file which is then automatically assigned a unique document identification number at 327. Class selection of the captured digital data can be performed at 328 before it is combined with upload information and operations at 329. The digital data and upload information and operations are then stored in the internal multi-media database at 156.

The class selection allows for data organization, indexing and retrieval. In different usage scenarios, class selection 328 may perform different roles. For example, while uploading the picture data, the class selection may present the predetermined choices such as vacation or birthday, which are further used to disposition the data in an appropriate folder on the remote server. However, while dealing with an accounting document, such classification schemes may provide information such as chart of account or account to charge in order to accurately make a journal entry in a bookkeeping database.

The upload device data process is shown generally at 330. If a proximal network is detected, the user 110 is not needed to participate any further in the upload device data process 330. If the multi-media database 156 contains digital data which needs to be backed up the file, file type, and disposition information 332 are retrieved for each set of data to be uploaded. A network connection is secured at 334. Remote connection, login, and identity verification are performed at 336. Identity verification is performed by using the previously stored login ID and password information 150 and in some cases, for extra security, including the unique device identification 160. Once connection is secured for the next set of files from the multi-media database 156, the digital files are transmitted to free internal memory at 338. The digital files are thereby sent over a wide area network 170 to the appropriate remote storage site 175.

FIG. 3 shows an exemplary configuration record 150. The record format is designed to provide simplicity and versatility. The format, as shown, achieves an intended simplicity by limiting user tasks to button pushes. Each button push can be captured by means of actions. If there exists a hierarchy of actions, nested action blocks are used to traverse the action hierarchy. In addition, each action type includes parameters which are used to complete the action. For example, an authentication action may have login, password, and web URL as its input parameters. Furthermore, each action configured can be accompanied by an optional script block that can help accurately execute the actions to compensate for the frequently changing web environment.

Thus, configuration records include configuration parameters and action scripts. The configuration parameters such as login id, password, and web URL are provided by the user during the device setup procedure. Since the web is a continuously changing environment, supporting many types of object models, a simple script to authenticate may not work well with all the remote sites. To overcome the underlying challenge, three or more models are provided to communicate to remote sites for desired outcomes. In scenario (1), the method uses exported webservice objects from the underlying sites. Webservice is rapidly transforming the business to business communication over the web. Provided that the service provider has implemented such a model, this scripting model can readily plug into these services and accomplish the user preferred actions. Under the scenario (2), business partners may choose to select standards defined by the device communication and scripting model and support it over the web for their customers. In scenario (3), the remote site implements a complete proprietary object model over the web. For example, the remote site may choose to use Java Objects, ActiveX components, or Flash elements for ease of user interactions. For such service providers, the automated scripting environment will directly interact with the website's graphical elements for data input and outputs. Such features can easily be implemented using testing frameworks used for automatically testing the graphical user interfaces. The challenge here is generation of scripts that can cope with the wide array of services available over the web. In such scenarios, various embodiments will provide computer tools which will aid users to record their interactions over the web for specific actions and generate the scripts automatically for their custom use. For popular sites such as apple.com, istorage.com, myspace.com, or Kodak.com, pregenerated and tested scripts are provided to work robustly for their services. In a preferred environment, users may also contribute their recorded scripts to the provided database for distribution.

FIG. 4 shows exterior hardware of an embodiment of an automatic authenticating router device including inputs, outputs and user interface. In various embodiments, the PMAAR device 100 includes a scanner 50, a number of colored LED's or some other type of device status indicators 10, a receptacle for catching the scanned documents in a collector tray 80, a graphical display 70 which can show the available selections for the setup process 310, status of the current scanning process, the current job status, status of job transmittal, document number, and remaining memory capacity among other status levels. Status indicators could also indicate remaining battery life or need for charging.

As shown in FIG. 4, the reconfigurable buttons 90 can be used for selection of menu items shown on the display 70 or the display itself may be a touch sensitive device. The buttons 90 can in some cases consist of a whole alphanumeric keyboard. The connectors 30 shown are a partial selection of those which are most common at this time and include modem 31, USB 34, Ethernet 32, and Firewire 33. Communication is also possible through the PMAAR device 100 providing a wireless port 35. Connection ports 60 which allow easy insertion of memory cards such as compact flash 61, or secure digital 62, are also part of the preferred embodiment. Access to the scanner 50 which includes a powered mechanism for feeding the documents at an optimum speed is provided to allow its un-jamming which can be necessary for any paper feed type mechanism. Also shown is a connector for connection to an exterior power supply 20 although the device 100 will contain an internal battery driven power supply.

The embodiments of FIG. 4 can vary according to scanner size. A personal model is constructed to be able to accept up to four inch wide receipts which are most commonly printed by cash registers. The personal version may also be designed to be as small as possible and for that reason may not have all the listed communication ports, a catch drawer, or even a motor or display. The larger desktop version will be designed to handle the width of a full 8/12 inch page. The desktop version is thereby able to scan virtually all size accounting documents. The software within the PMAAR 100 may include an intelligent print recognizer such that the user is informed that the document must be rescanned in the alternate direction or which is able to rotate the image once so scanned.

As shown in FIG. 4, the PMAAR device 100 is highly portable which is important in its role as the physical basis of a "scan and forget" system by which the user can for example scan key financial documents into device memory. Pre- or post-scanning the operator uses the reconfigurable control switches or buttons 90 to make a class selection 329, for example between entertainment or gasoline expenses, then in coordination with the scanning process 326, the built in printer 55 assigns and automatically prints a unique document ID on the receipt. In this embodiment, after digitization by the device scanner 50, the scanned document can be placed in the collector tray 80 for convenience. The device 100 stores the image information from the scanned receipts indefinitely. In an embodiment with sufficient computing power, onboard hardware and software can perform document deskewing, denoising and enhancement of images for OCR. Depending on the capabilities of the computing hardware beyond the basic device 100, the scanned images can be compressed to save memory space and even encrypted to protect privacy of the stored data.

Further, the device 100 has external interfaces such as USB 34, Firewire 33, Ethernet 32, and WiFi 35. As soon it is able to make use of these internal communication capabilities, the routing device 100 uses the internet or other information transmission medium to send the stored data to data management services such as remote transcription operations which can extract key accounting data and reformat it such that it can be exported directly to proprietary online accounting systems.

Figure 5A:
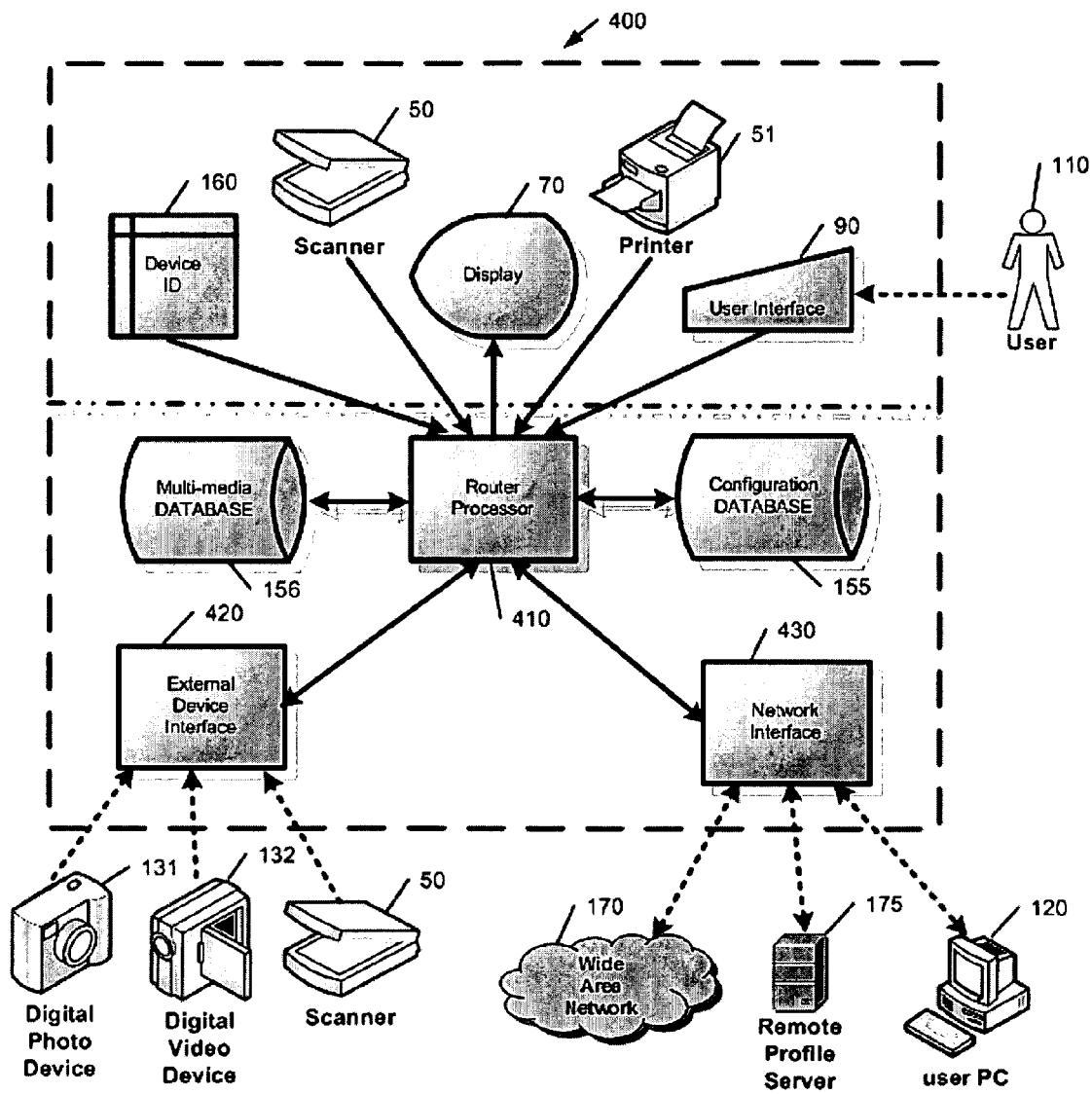
FIGS. 5a and 5b show block diagrams of exemplary internal device hardware of an automatic authenticating router device.
Figure 5B:
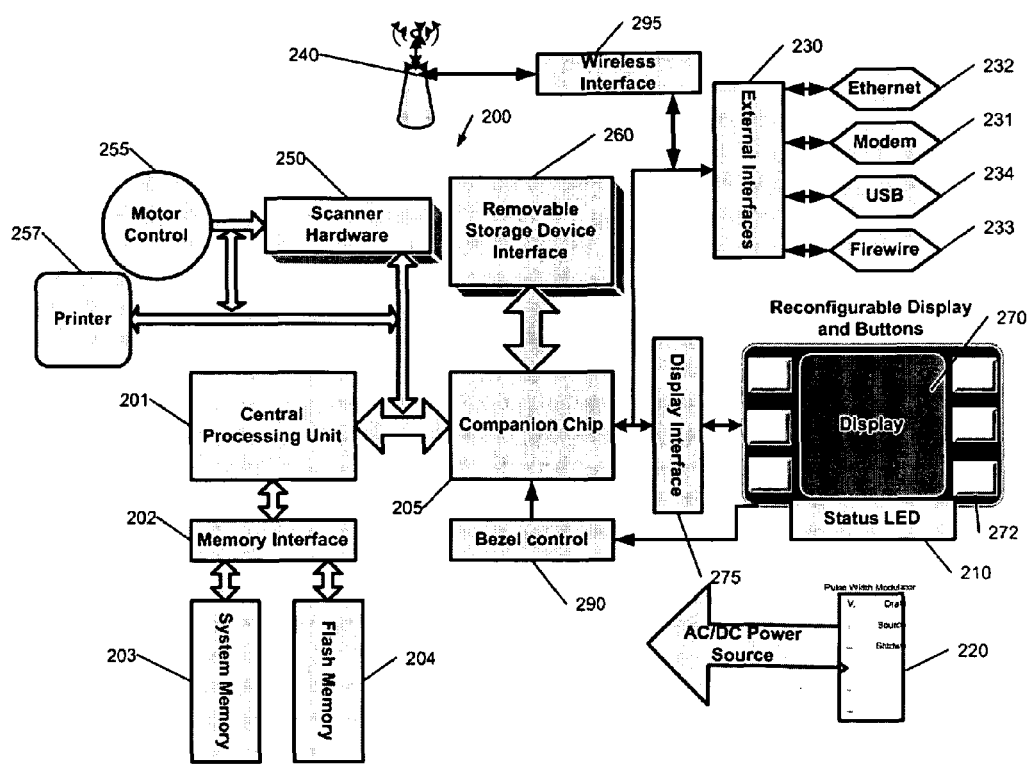

FIGS. 5a and 5b show block diagrams of exemplary internal device hardware of an automatic authenticating router device. As can be seen in FIG. 5a, a basic device 100 includes a simple embedded processor which can display simple text messages and execute file storage commands. A router processor must also be able to send commands to communication circuitry. The device hardware includes internal memory holding the routing information in the configuration database 155 and additional memory storage for holding the software instructions and buffering of the multi-media metadata and multimedia files prior to uploading them to the wide area network 170, users pc 120, or remote server 175 among other locations.

In various embodiments the device hardware comprises the items in the lower rectangle and any combination of the items in the upper rectangle. With addition of the device identification 160 embedded in the hardware, derived by means of processor's unique id, MAC of the networking interface, or factory programmed in an ROM, each device is associated with a specific identity. Such identity could be of a form of an end user or a department in a business setting. With addition of a built-in scanner 50, the router can most efficiently be used to upload receipts for expense reports and other business accounting purposes. Inclusion of an LCD or other form of graphical or even text display 70 is useful for either feedback to the user of simple device status information such as memory or battery charge condition. However, the display 70 when combined with an user interface 90 can allow the user 110 to further improve the specificity of the routing process. For example, as a document is scanned the user 110 can view classification options on the display 70 and via the user interface 90 select the appropriate option. This document image will then be routed to exactly the correct location. Inclusion of printing hardware 51 within the device hardware 400 will allow the scanned documents to have their unique document identification number printed directly on the original document which can assist in locating the hardcopy version of a document that has been filed for audit purposes. The external interface 420 is used to capture the data from external multimedia devices such as cameras, camcorders, or scanners. The use of universal plug and play determines the device and content type in this scenario. Similarly, network interface 430 is used to connect the device to the external servers, computers and storage facilities for data routing, synchronization, or device configuration operations.

FIG. 5b illustrates device hardware architectures corresponding to the external hardware design shown in FIG. 4. A central processor unit (CPU) 201 executes the core processing algorithms. A memory interface module 202 presents a system level interface between central processing unit 201 and the memory embodied in the volatile system memory 203 and non-volatile flash memory 204. A companion chip 205 provides interface for the central processing unit module 201 to peripherals chips such as memory controller, and graphics. A display interface module 275, and graphical display module 270 provide graphical user interface which can preferentially consist of a touch screen display. While this graphical display is sufficient to display any information, the device 100 also contains status indicators 210 which can quickly indicate conditions to the user such as memory full, or battery low, or status of internet communications. A power supply module 220 provides a rechargeable power source for the device 100. The external memory interface module provides an interface for external memory components such as among others compact flash, and memory stick.

As shown in FIG. 5b, other components include a scanner hardware module 250 which performs optical scanning of the documents fed by a scanner motor control module 255 which drives the motor that helps feed the paper documents. A printer module 257 includes a permanent marking mechanism that physically prints the unique identifier during assignment of document identification 327 for each document and also inserts the same identifier electronically within the scanned digital data file.

An Ethernet module 232 provides a physical layer for a wired external network interface module 230. A wireless interface module 295 provides a physical layer of 802.XX RF link to make possible wireless communication. A modem module 231 presents a physical interface that uses phone and phone lines as a medium to transmit and receive digital data. A USB module 234 provides a universal system bus interface. A Firewire module 233 provides an IEEE 1394 interface. ATAPI, SATA or SCSI presents a controller interface to the large non-volatile storage devices.

In summary of FIGS. 1-5, the PMAAR device 100 provides functionality and features to overcome the problems in device uploading. As shown, various embodiments of the automatic authenticating router device: 1) are portable such that a user could take it with them on business trips and in their car so that they can soon upon acquiring a receipt, process it using the invention and thereby be protected from both loss of the receipt, or degradation of the document with time; 2) incorporate a scanner to acquire the document image and memory to store that image; 3) preferably contain means to connect directly to phone lines using an internal modem or to the local or remote computer via internetworking; 4) contain means for storing captured information in a non-volatile memory; 5) include means to capture information manually entered by the user; 6) contains means to execute OCR algorithm software embedded to automatically capture document information; 7) contain means to print a unique document id on each scanned document; 8) contain means to physically store scanned papers; 9) contains means to generate a report of the scanned data designed to be compatible with the accounting standards in general and the users accounting software in particular.

Figure 6:
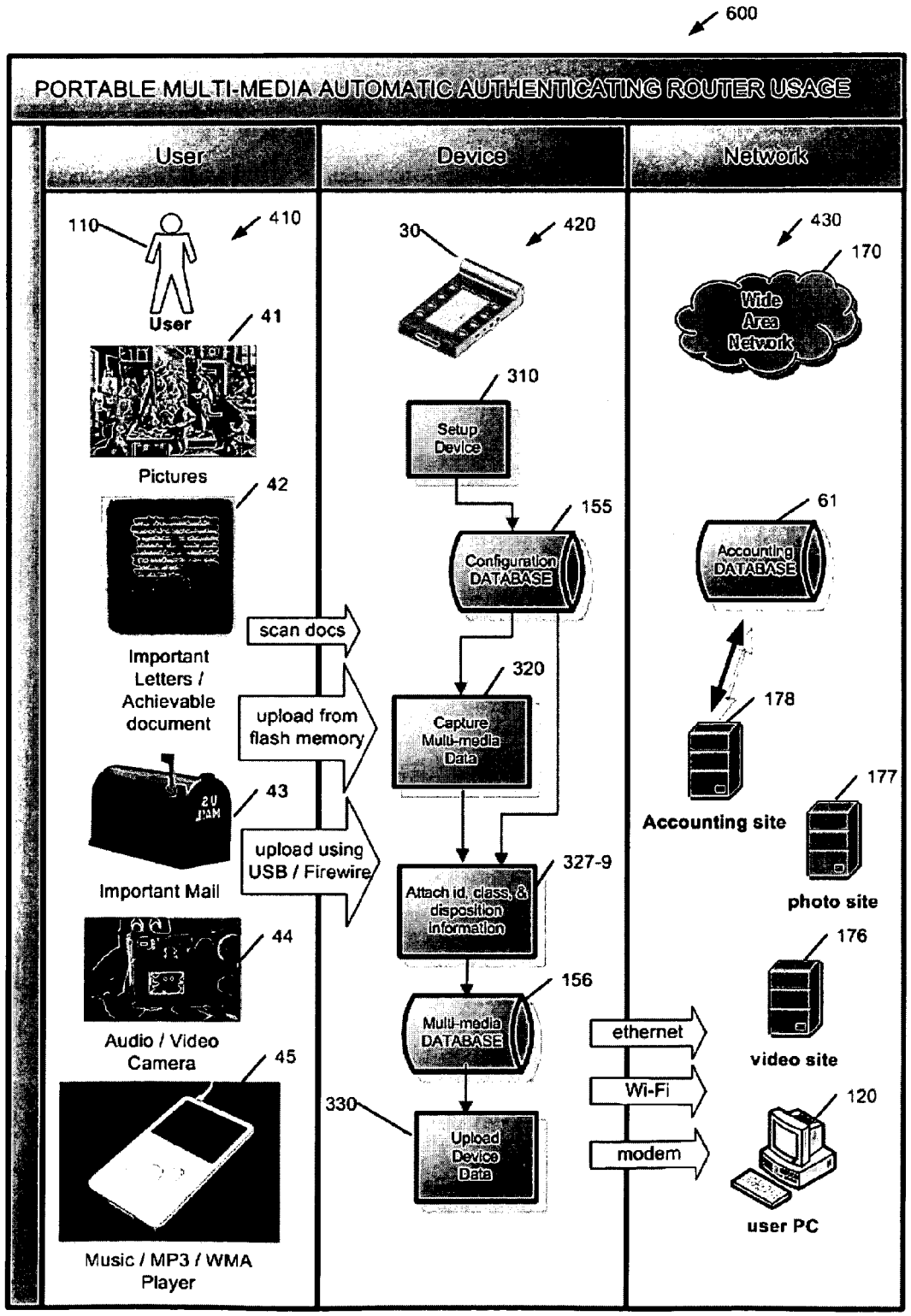
FIG. 6 shows an exemplary method of a user interacting with an automatic authenticating router device.

FIG. 6 shows an exemplary method of a user interacting with an automatic authenticating router device. The invention user 110 can perform operations to handle various media types 410 as shown in the leftmost column. The user 110 can be an individual, an accountant, or an employee or a business. The user is assisted in capture of photographs 41 and letters or documents or receipts 42. Connection of external devices to the ports as shown in FIG. 3 and described above facilitates capture of email 43 from personal computers, digital video 44 from camcorders, and audio files 45 from mp3 and other music players.

The middle column in FIG. 6 shows all operations 420 the user can perform with the invention subsequent to performing the setup device 310 process. Setup procedures include establishing routing information in the configuration database 155 for account authorizations and establishing locations for remote databases. Capture of multi-media data 320 includes that from all digital data sources 410 including paper based documents using scanning functions. The captured data has identification, class type, and disposition information attached to it before storage. The scanned image and additional meta-data information is stored into the multi-media database 156 located in nonvolatile memory until the upload device data 330 function can be performed. The upload data function can make use of all communication means to transmit files via ethernet, wi-fi, or modem to the network environment 430.

Usage in the network environment 430 is depicted in the rightmost column of FIG. 6. Transmission of files is through a wide area network 170 to remote sites that includes the user personal computer 120, video site 176, digital photo site 177, and an accounting site 178 for storage of accounting database information 61 among others. The novelty and usefulness of the invention derives from the fact that after providing data sources 410 and setup of the device 310 and performance of data capture 320 by the user, the device operates automatically in the network environment 430 without requiring any interaction from the user.

FIGS. 2, 3 and 5 when combined can illustrate the overall use structure when applied towards accounting purposes. For this application area, the activities the user of the invention performs are the setup device 310, scanning of paper based financial documents and receipts. The device 100 then prints a unique id number on the receipt 327, acquires classification data 328 from the user, stores the scanned information into internal memory 156 and then may perform localized OCR on the image to capture the key information. The user empties the collection tray 80, and puts the month of collected reports in a labeled folder. An advanced version of the device verifies the captured data with the images, correcting the errors, and either synchronizes the collected information 330 (scanned images and OCR data) with local computer based accounting software 120 or transmits information to a remote server 175 through modem, removable flash media, USB, Firewire, serial, wireless or ethernet connections.

Various embodiments of the device lend themselves to different operational modes. A standalone embodiment of the invention is designed in a compact form for portability and usage primarily on a desktop or in a vehicle. As described, the PMAAR device 100 is preferably used in applications where its portability is of benefit. This embodiment may for example be carried in a pocket, or kept in the user's car. The portability allows it to be used to scan and electronically store receipts as they are acquired. The buttons are kept to a minimum as well, in order to allow the device to be small, but it still embodies controls to allow the user to select receipt types and select operational modes. This standalone configuration may contain embedded OCR software which can read key fields and capture their value for accounting and/or business purposes. The portable device can synchronize the scanned information with the user's accounting system via either the removable memory card, one of the communication ports such as USB, or wirelessly.

Another embodiment is designed to be connected directly to a personal computer. This connection may be via a wireless or wired connection using the above mentioned protocols. Alternatively a memory stick can be used to shuttle files between the device 100 and the user PC 120. The accompanying software for personal computers can perform more advanced OCR processing than any embedded software running in the standalone embodiment. The desktop software will extract more complete and accurate information from the receipt or other documents. The computer program 100 will work compatibly with the personal or business accounting software that may be installed on the PC. The personal computer based software can also manage the collection of associated accounting documents for indexing, retrieval and report generation.

Another embodiment provides a device connected to a remote server via Ethernet, a modem or internet connection. The computing power of the remote server conveys advantages to this configuration. After the scanned information is transmitted to the server, the server manages the client account and data.

Figure 7:
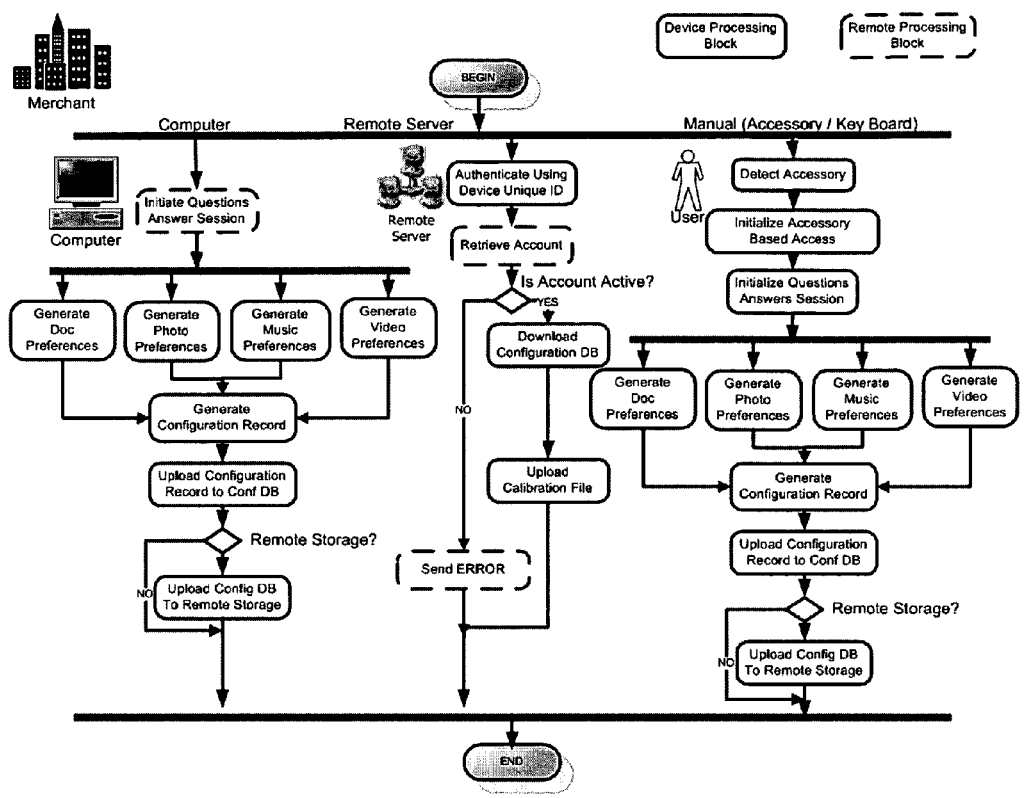
FIG. 7 shows a process flow diagram illustrating a method of configuring an automatic authenticating router device for various services and information types.

FIG. 7 is a flow chart diagram that details the steps for a user to perform the setup device 310 process summarized in FIG. 2. The device 100 will come with default accounts entered, which can either be accepted or altered. There can be at least three main means to set the routing information. In the first case, the device is connected to a local personal computer. In this case, the user is prompted with various choices to input the information regarding authentication, classification, and the desired information dispositions. In some cases the classification information can be extracted from the databases used by the user for various tasks. For example, if found, the chart of accounts and the chart of vendors and any other charts which may be present in an accounting application database can be used to automatically create classification information for PMAAR device's to be used for financial document management.

As shown in FIG. 7, in the middle branch of the flowchart for the setup process, the device 100 is connected to the remote server via a wide area network. This configuration, in particular, is useful for the customers who are not computer savvy. Similar to setup employing the personal computer, the main task of remote machine is to prepare user specific configuration information. Such information can be prepared again using a set of questions and answer choices on the web or by the user having a telephonic conversation with a support operator. Once a user routing profile is created on the remote server containing the user authentication, classification and disposition information, this profile is downloaded by the device using wide area network connection. The device's unique hardware identification number can be used to manage the association between user and its profile.

The final form of device setup, as shown in FIG. 7, configures the routing information manually. Again, a set of questions are presented to the user to capture various data type routing and classification information. The answers are used to create the routing information file, which is later used for multimedia document classification and routing to remote servers.

Figure 8:
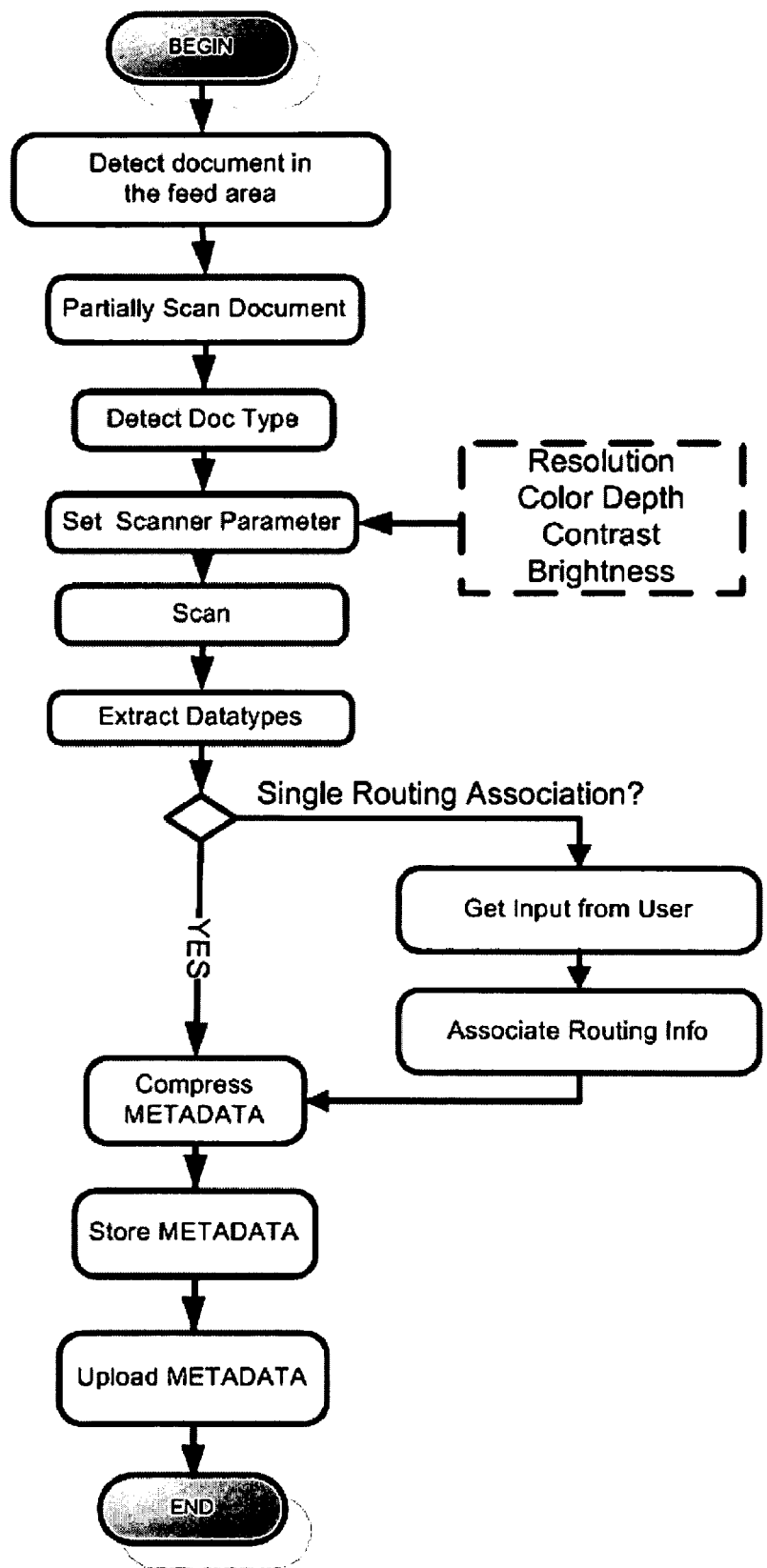
FIG. 8 is a process flow diagram for illustrating a method of capturing document data as performed by an automatic authenticating router device.

FIG. 8 is a flow chart diagram illustrating a method of capturing multi-media data 320 as shown in FIG. 2 to scan documents. The user inserts the document in the scanner feeder. Upon processing and extracting datatypes, if the information is found for a single action match, no further interaction is needed from the user to route this information. In the case when multiple desired user actions are found in the database for processed datatypes, the user is asked to select the document type using either the reconfigurable buttons 90 or touch screen of the display 70. Single touch classification or action can be prompted via frequently used shortcuts programmed via monitoring the user's daily use of the device. Several classifications may be necessary which are already present in the preconfigured memory as setup in FIG. 7. For example, if this document is of the type expense receipt then the user may also select its payment type. In addition, the device will assign a unique identification number to the scanned document. In the preferred embodiment, the device contains a printer, which through some print mechanism, imprints the identification number on the document as it is scanned. In a key embodiment, the device software performs OCR and extracts the key datatypes. The device stores both the user entered information, the OCR captured datatype information and the document image information (preferably in compressed form). In other embodiments, it is possible that the functions of the touch screen controls or buttons can be replaced with voice activated controls such as in the embodiment shown in FIG. 13.

Figure 9:
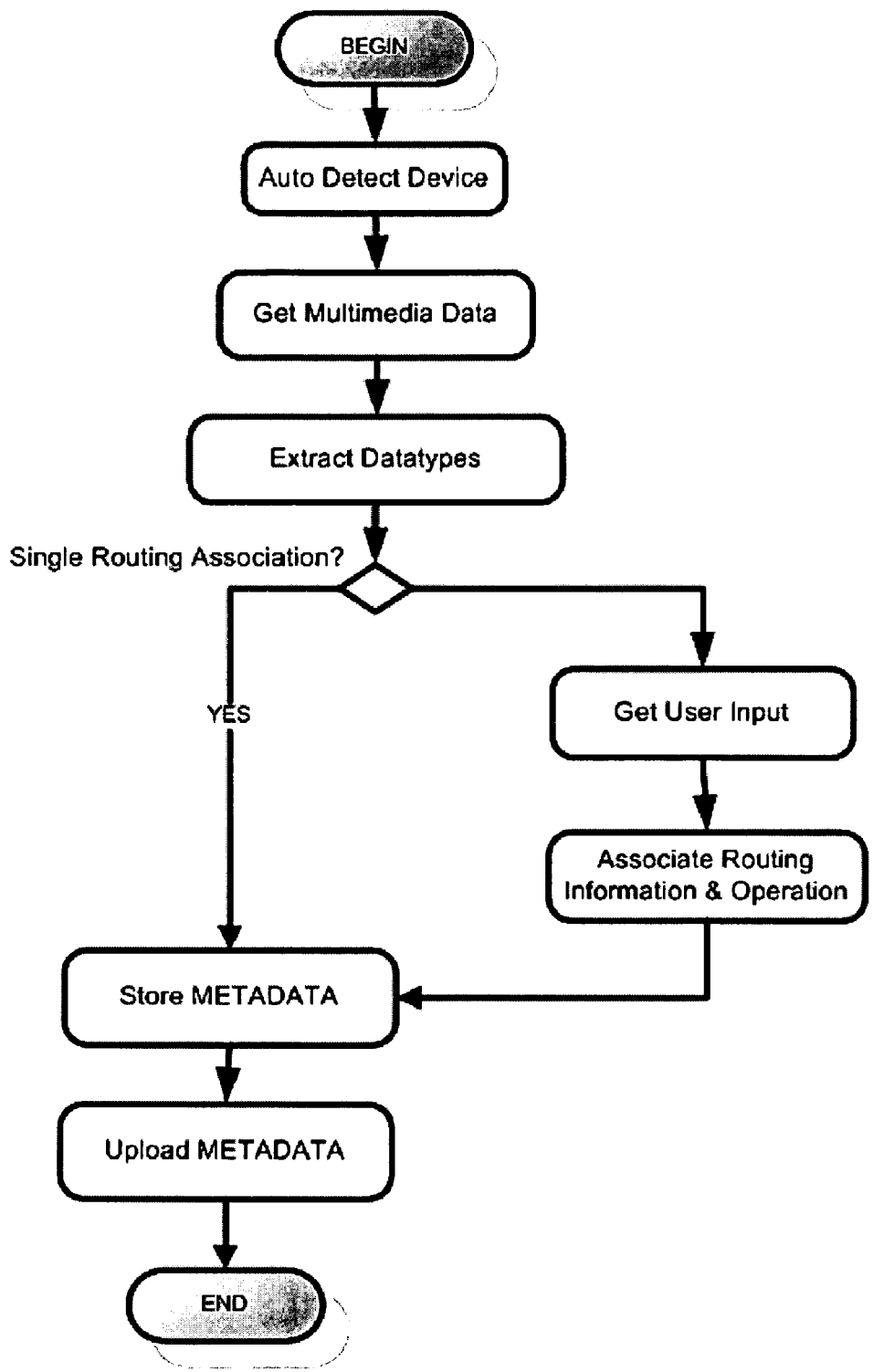
FIG. 9 is a process flow diagram for illustrating a method of capturing multi-media data as performed by an automatic authenticating router device.

FIG. 9 details the steps the device 100 executes when capturing the multimedia information such as digital pictures, video and music data. Since such information is readily available in capturing devices (cameras, camcorders, and music players), the PMAAR 100 simply acts as a switch that uploads this information to the remote server 175. When connected to these multimedia devices, the PMAAR device automatically detects the data type associated with the stream and presents some classification and dispositioning choices for user input. For example, while connected to a digital camera the PMAAR device may ask additional classification for the specific photo shoot such as vacation, birthday party, and graduation among others. In the case of a music player, the PMAAR 100 may for example solicit choice of data synchronization versus simple data upload. Digital video may go through additional transcoding before uploading to the remote backup site. While working with multimedia data, the internal memory is used for optimizing the upload, synchronization or transcoding and uploading tasks as selected by the user.

Figure 10:
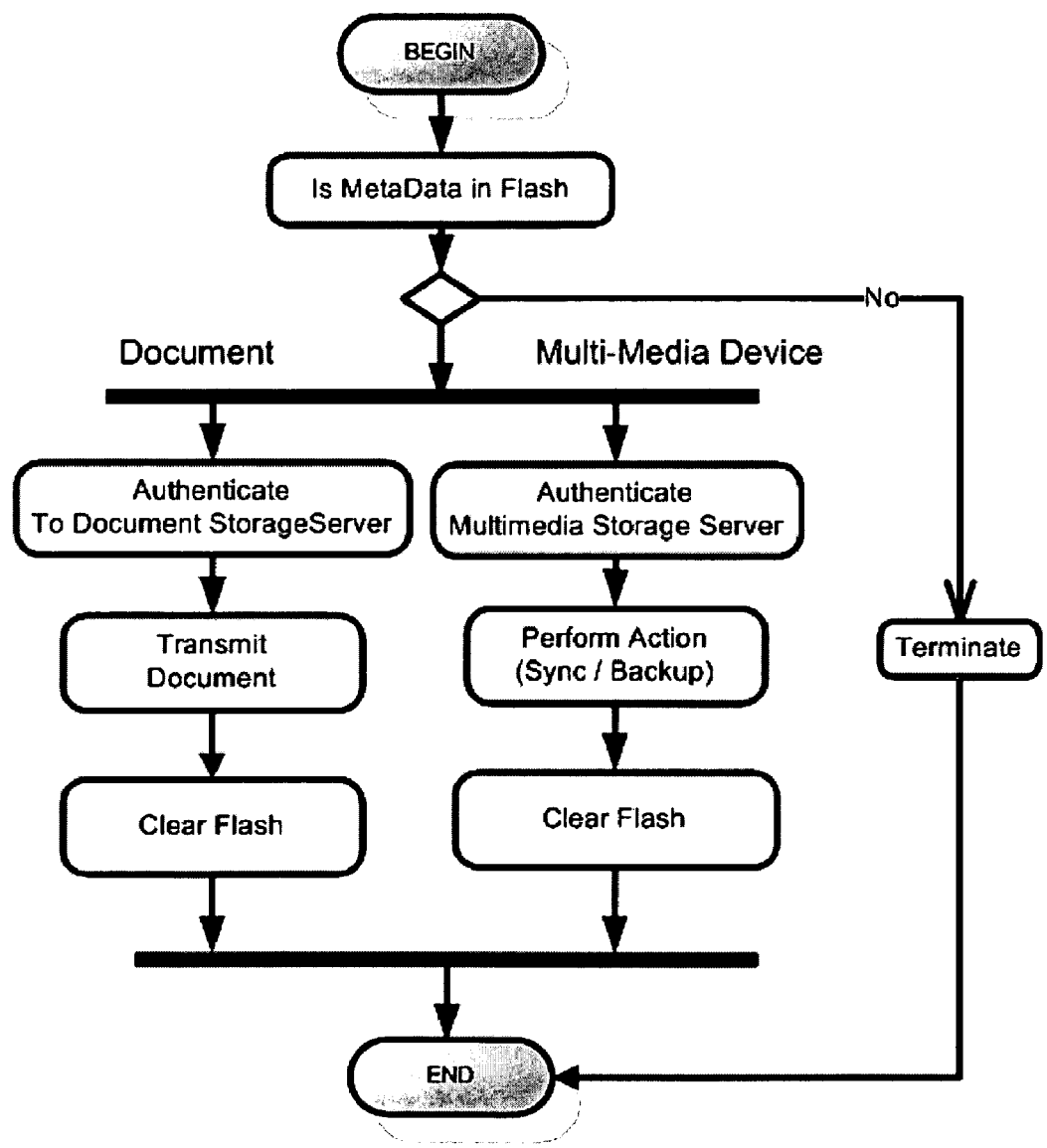
FIG. 10 is a process flow diagram illustrating a method of uploading device data as performed by an automatic authenticating router device.

FIG. 10 is a flow chart diagram that details the steps for a user to perform the upload device data 330 process summarized in FIG. 2 by which the device 100 transmits stored multi-media metadata 156 to the remote server 175. Because of its compact size, the device 100 may only store a limited amount of information and therefore must periodically upload the scanned information to the server for processing and permanent storage. If the device 100 is not continuously connected to a means for data transmission, a memory usage status indicator 10 will inform the user that no more receipts can be stored without archiving the already scanned information. The user is thereby conditioned to attach the device 100 to a communication port when the memory is low. When the device 100 recognizes a connection has been physically made, it checks to see if any transactions are in the queue for transmission. If not, the device deactivates the transmission process. If the memory contains information for transmission, the device connects to the server, performs an automatic login, sends the image and OCR data and upon completion disconnects the communications. Once sent, the data is deleted from the device.

Figure 11A:
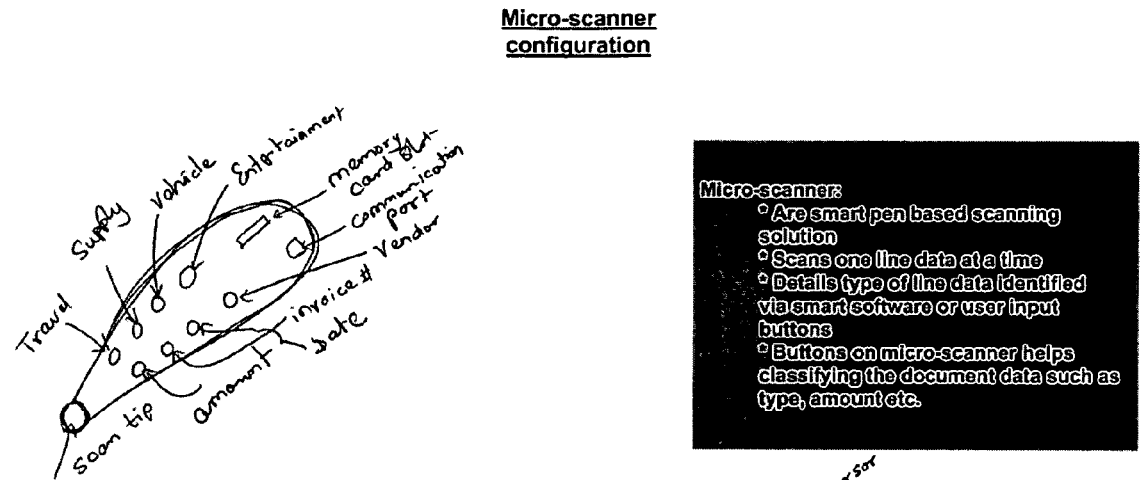
FIGS. 11a and 11b are illustrations of exemplary automatic authenticating router device including a micro-scanner.
Figure 11B:
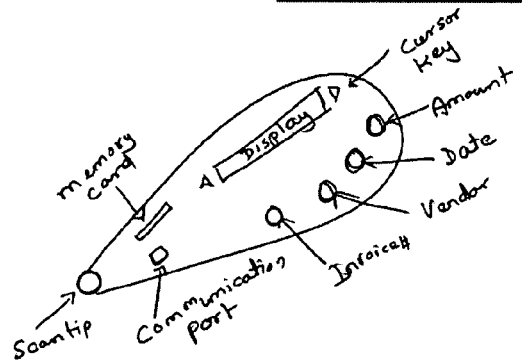

FIGS. 11a and 11b are illustrations of exemplary automatic authenticating router devices including a micro-scanner. The small handheld device in FIG. 11a is used such that the operator selects a button and then runs the device tip over that item. This allows the software to quickly capture the pertinent information without needing to scan the whole document. As noted, more classification categories can be included with additional control inputs or with a smart user interface. A small numeric keypad can be used to enter amounts, which are not amenable to scanning and OCR recognition.

The embodiment shown in FIG. 11b includes a small display, preferably an LCD, which can show either a one line summary of performance or the captured image and OCR output immediately side by side for verification by the user. Any problems can be corrected with a numeric keypad and the other buttons.

Figure 12:
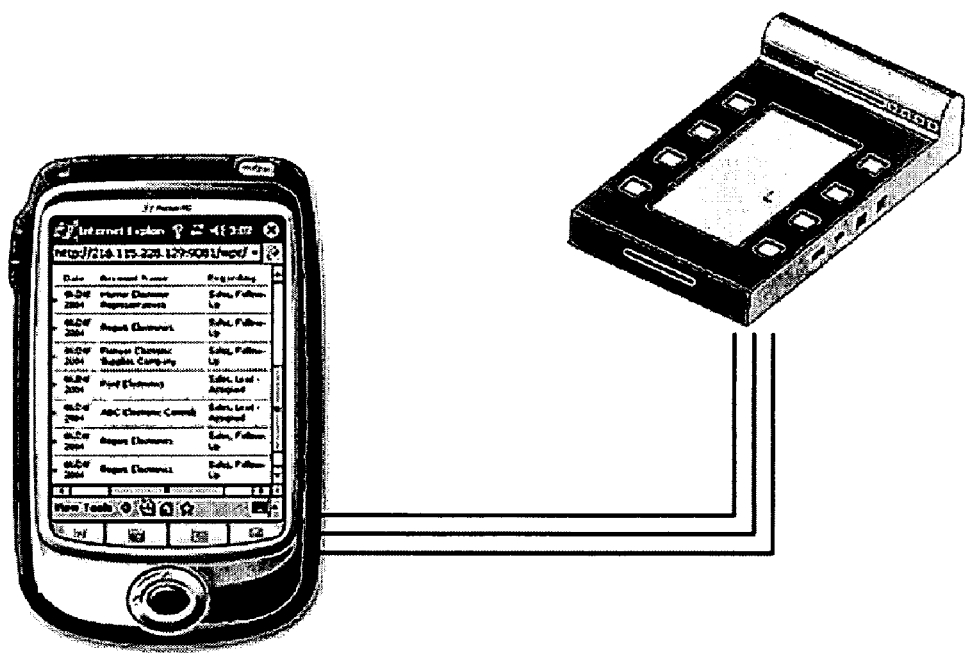
FIG. 12 illustrates an automatic authenticating router device configured to communicate with a personal digital assistant PDA or cell phone.

FIG. 12 illustrates an automatic authenticating router device configured to communicate with a personal digital assistant PDA or cell phone. As shown in FIG. 12 the device 100 is connected directly or via wireless or wired means to a PDA device. The PDA can then act to provide the computing power and memory for the device 100 connected to it. In the case when the PDA is connected directly to the device 100, the device hardware can be minimized to take advantage of processing power within the PDA. This could make the device 100 more compact and inexpensive for users that already have a PDA. The device 100 scanner may optionally have a document collection tray 80 as shown in FIG. 3. From the PDA, the data can easily be moved to other computing systems or accounting software. The synchronization process between PDA and personal computers can be performed via WiFi, USB, serial, or infrared or any other physical layer existing in this embodiment.

Figure 13:
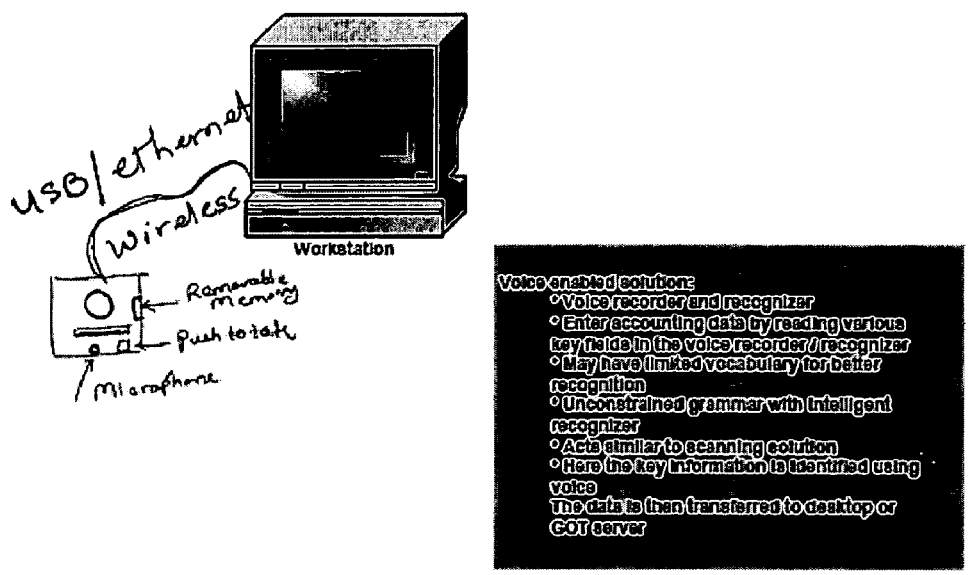
FIG. 13 illustrates a desktop application configured to collect audio data.

FIG. 13 illustrates a desktop application of the device configured to collect audio data. This variation of the device includes a microphone and speaker and controls for regulating the microphone input. The software of the device includes functionality to record the voice and recognize the spoken commands. The necessary commands are limited in quantity of required vocabulary. The document fields to be captured can be verbally enunciated by the user reading the various accounting fields necessary to be captured off the receipt. The constrained vocabulary permits better recognition on a limited computing powered device. Vocabulary necessary will include the classification categories, the numerals and units of monetary measure, among other key words. This voice input functionality can be made easier to operate by allowing an unconstrained grammar along with the intelligent recognizer. The recognizer performs similar functions to those of the OCR recognizer in assisting the user to capture the key field information. This voice control could also be used in coordination with the desktop verifier software as well as be used by the server based verifier software to speed data entry by the verification staff. The side-by-side OCR and original data can be presented to the verifier and instead of keying in the corrections the voice input can be used instead of or in conjunction with a keyboard entry device.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A routing apparatus, comprising:
   a processor;
   a scanning module that captures images of receipts;
   a first storage medium that stores local copies of the captured images of receipts;
   a second storage medium that stores software instructions that are performed by the processor,
   a third storage medium that stores configuration records, a configuration record include at least one configuration parameter defining a value for accessing a remote storage device that stores accounting data and an action script defining a process for causing an image of a receipt to be stored on a remote storage device that stores accounting data;

a display;

a plurality of user input buttons, wherein the display displays input options to a user;

wherein the software instructions enable predetermined operations comprising:

detecting an availability of a network proximate to the routing apparatus;

performing character recognition on the image of a receipt to be backed up on a remote storage device that stores accounting data and determining information regarding a classification of the receipt;

receiving user input via the user input buttons, wherein the user input defines a classification of the receipt to be backed up which is used for storing the image of the receipt to be backed up at the remote storage device;

utilizing a configuration record from the third storage medium based on the classification of the receipt to be backed up;

automatically establishing a connection with the remote storage device that stores accounting data using a retrieved configuration record;

associating routing information with the image of the receipt to be backed up based on the classification of the receipt to be backed up, wherein routing information indicates a network address of the remote storage device; and automatically uploading the image of the receipt from the routing apparatus to the remote storage device based on the routing information, thereby causing the image of the receipt to be backed up to be stored in a particular location on the remote storage device based on the classification of the receipt.

* * * * *